US 8,045,713 B2

(12) United States Patent
Lain et al.

(10) Patent No.: US 8,045,713 B2
(45) Date of Patent: Oct. 25, 2011

(54) CRYPTOGRAPHIC KEY UPDATE MANAGEMENT METHOD AND APPARATUS

(75) Inventors: Antonio Lain, Bristol (GB); Viacheslav Borisov, St. Petersburg (RU)

(73) Assignee: Hewlett-Packard Development Company, L.P., Houston, TX (US)

( * ) Notice: Subject to any disclaimer, the term of this patent is extended or adjusted under 35 U.S.C. 154(b) by 2295 days.

(21) Appl. No.: 10/814,608

(22) Filed: Mar. 30, 2004

(65) Prior Publication Data

US 2005/0018853 A1 Jan. 27, 2005

(30) Foreign Application Priority Data

Apr. 8, 2003 (GB) .................................. 0308073.6

(51) Int. Cl.
*H04L 9/00* (2006.01)
(52) U.S. Cl. ............... 380/277; 380/28; 380/30; 380/44; 380/259; 380/260; 380/278; 380/279; 380/268; 380/281; 380/282; 726/4; 726/6; 726/13; 726/21; 713/153; 713/155; 713/156; 713/162; 713/163; 713/170; 713/176
(58) Field of Classification Search .................... 380/278
See application file for complete search history.

(56) References Cited

U.S. PATENT DOCUMENTS

| 6,049,878 | A * | 4/2000 | Caronni et al. ................... 726/3 |
| 6,363,149 | B1 * | 3/2002 | Candelore ........................ 380/45 |
| 6,606,706 | B1 * | 8/2003 | Li ................................. 713/162 |
| 7,043,024 | B1 * | 5/2006 | Dinsmore et al. ............. 380/278 |
| 2002/0059286 | A1 * | 5/2002 | Challener ...................... 707/100 |
| 2003/0126464 | A1 * | 7/2003 | McDaniel et al. ............ 713/201 |
| 2003/0198350 | A1 * | 10/2003 | Foster et al. .................. 380/281 |
| 2004/0114762 | A1 * | 6/2004 | Medvinsky .................... 380/277 |

FOREIGN PATENT DOCUMENTS

WO 01/76133 A1 10/2001

OTHER PUBLICATIONS

Canetti, R., et al., "Multicast-security: a taxonomy and some efficient constructions," *Infocom '99*, vol. 2, pp. 708-716, (Mar. 21-25, 1999).
Chang, Isabella, et al., "Key Management for Secure Internet Multicast using Boolean Function Minimization Techniques," IBM T.J. Watson Research Center, pp. 689-698 (1999).
Pinkas, Benny, Efficient State Updates for Key Management, Star Lab, Intertrust Technologies, NJ, USA, pp. 1-16, Nov. 1, 2001.
Wallner, D., et al., "RFC 2627—Key Management for Multicast: Issues and Architectures," National Security Agency, pp. 1-17, (Jun. 1999).
Wong, Chung Kei, "Secure Group Communications Using Key Graphs," IEEE/ACM Transactions on Networking, vol. 8, No. 1 pp. 16-30 (Feb. 2000).

* cited by examiner

*Primary Examiner* — Nathan Flynn
*Assistant Examiner* — Bryan Wright

(57) ABSTRACT

A method and apparatus is provided for consolidating cryptographic key updates, the consolidated update information enabling, for example, a returning member of a secure group who has been offline, to recover the current group key, at least in most cases. The unconsolidated key updates each comprise an encrypted key, corresponding to a node of a key hierarchy, that has been encrypted using a key which is a descendant of that node. The key updates are used to maintain a key tree with nodes in this tree corresponding to nodes in the key hierarchy. Each node of the key tree is used to store, for each encrypting key used in respect of the encrypted key associated with the node, the most up-to-date version of the encrypted key with any earlier versions being discarded. The key tree, or a subset of the tree, is then provided to group members.

21 Claims, 4 Drawing Sheets

CRYPTOGRAPHIC KEY UPDATE MANAGEMENT METHOD AND APPARATUS

FIELD OF THE INVENTION

The present invention relates to a method and apparatus for managing cryptographic key updates and, in particular, but not exclusively, to the consolidation of key updates for use by a re-connecting member of a secure dynamic group where all the group members share a secret key that is subject to continual change to match current group membership.

BACKGROUND OF THE INVENTION

Many applications require an efficient and secure mechanism to distribute information to a dynamically changing trusted community. Typically, such a mechanism involves forming a secure group whose members share a secret cryptographic key. This key is updated to a new version when a new member joins the group (so that the new member cannot access previously shared information protected by the key—so-called "backward confidentiality") or leaves the group (so that the leaving member cannot access future shared information protected by the key—so-called "forward confidentiality"). The responsibility for controlling the shared key, and therefore the membership of the group, is carried out by a functional entity which is referred to herein as the key manager. A simple implementation of the key manager involves the latter making a private communication to a new member and each existing member (in the case of a newly joining member), or to each remaining member (in the case of a member leaving the group) to provide the new version of the shared key. However, in order to make this key update operation more scalable, there are well-known techniques that combine a multicast transport with a Logical Key Hierarchy (LKH), reducing the complexity of this operation to logarithmic with the size of the group (see, for example, "Key management for multicast: Issues and architectures" Internet Request for Comment RFC 2627, Internet Engineering Task Force, June 1999).

Unfortunately, robust key management in known multicast LKH schemes generally requires that members are always on-line to reliably receive key updates in a timely manner. This can limit the applicability of these schemes when the community is large and loosely coupled, or the connectivity between members is poor, or just simply when the most common behaviour of a member is to be off-line. In these cases it can be too expensive (in terms of processing and communication resources used) to treat members as being evicted from the group concerned when they go off-line.

Various proposals have been made in respect of improving the reliability of group re-keying with a focus on key recovery for on-line members when there are failures of the multicast transport. Such proposals assume that only a few key updates are lost, or that members will always be able to take an immediate recovery action. An extreme of this approach are key distribution schemes that assume a reliable group communication middleware underneath, e.g., extended virtual synchrony semantics, in order to update keys reliably.

In the context of secure distribution of copyright protected material, detailed studies have been made concerning how to encrypt broadcasted content so that only a dynamically changing group can decrypt it (see broadcast encryption), and how to trace and exclude possible "traitors" that leak information. Typically, these schemes assume a single source and do not deal with an arbitrary number of "traitors" colluding. Moreover, in some cases they also assume that clients cannot update state dynamically, e.g., a DVD player with some pre-configured secrets, and this can make managing the forever-growing revocation information impractical.

The paper "Efficient state updates for key management" Benny Pinkas, ACM CCS Workshop on Security and Privacy in Digital Rights Management, LNCS 2001 considers how to minimize the amount of information needed to recover a client that is back on-line after missing some LKH key updates. However, it is assumed that this information is optimised for a particular client, and downloaded directly from the key manager.

It is an object of the present invention to facilitate key update management for members of a group who have missed a number of updates.

SUMMARY OF THE INVENTION

The present invention takes advantage of the observation that when a group member who has been offline becomes active again, he is usually just interested in the key currently being used by the group, and not in all the intermediate keys that were in use while he was off-line. This means that not all key updates are necessarily needed by a returning member. In general terms, the present invention provides for the consolidation of the key updates multicast by a key manager into a compact representation.

More particularly, according to one aspect of the present invention, there is provided apparatus for consolidating key updates provided in records that each comprise an encrypted key corresponding to a node of a key hierarchy and encrypted using a key which is a descendant of that node, hierarchy-node information for both the encrypted and encrypting keys, and key-version information for at least the encrypted key; the apparatus comprising a communications interface for receiving said records, and a manager for maintaining, on the basis of the received records, a key tree with nodes corresponding to nodes in said hierarchy, the manager being arranged to store in association with each tree node, for each encrypting key used in respect of the encrypted key associated with the node, the most up-to-date version of the encrypted key and its version information with any earlier versions being discarded.

As the keys stored in the key tree are in encrypted form, the apparatus can be located in any part of the communications network used for key update distribution and, in particular, can be situated where it can most reliably receive the key updates from the key manager and multicast the key tree, or a subset of it, to returning members. More than one apparatus can be provided in the network.

The key tree is client agnostic which enables the tree, or a subset of it, to be multicast to returning members without the need for customisation.

Since off-line members will generally keep state associated with previously known keys, it is possible to provide a subset of the key tree for sending to group members whilst still enabling the returning members to determine the current group key, at least within a target failure margin.

The present invention is particularly suited for providing key update information in a Anonymous Group Content Delivery (AGCD) system where content is encrypted with a group key (or a key encrypted using the latter). Generally, in such systems group membership can be highly dynamic and most members are likely to be off-line most of the time. The management of key updates thus needs to handle off-line members well. To this end, the key tree, or preferably a subset of it, is distributed along with the encrypted content.

According to another aspect of the present invention, there is provided a method of consolidating key updates provided in records each comprising an encrypted key corresponding to a node of a key hierarchy and encrypted using a key which is a descendant of that node, hierarchy-node information for both the encrypted and encrypting keys, and key-version information for at least the encrypted key; the method comprising a step of maintaining, on the basis of said records, a key tree with nodes corresponding to nodes in said hierarchy, this tree-maintenance step comprising a sub-step of storing in association with each tree node, for each encrypting key used in respect of the encrypted key associated with the node, the most up-to-date version of the encrypted key and its version information with any earlier versions being discarded

BRIEF DESCRIPTION OF THE DRAWINGS

Embodiments of the invention will now be described, by way of non-limiting example, with reference to the accompanying diagrammatic drawings, in which.

BEST MODE FOR CARRYING OUT THE INVENTION

Figure 1:
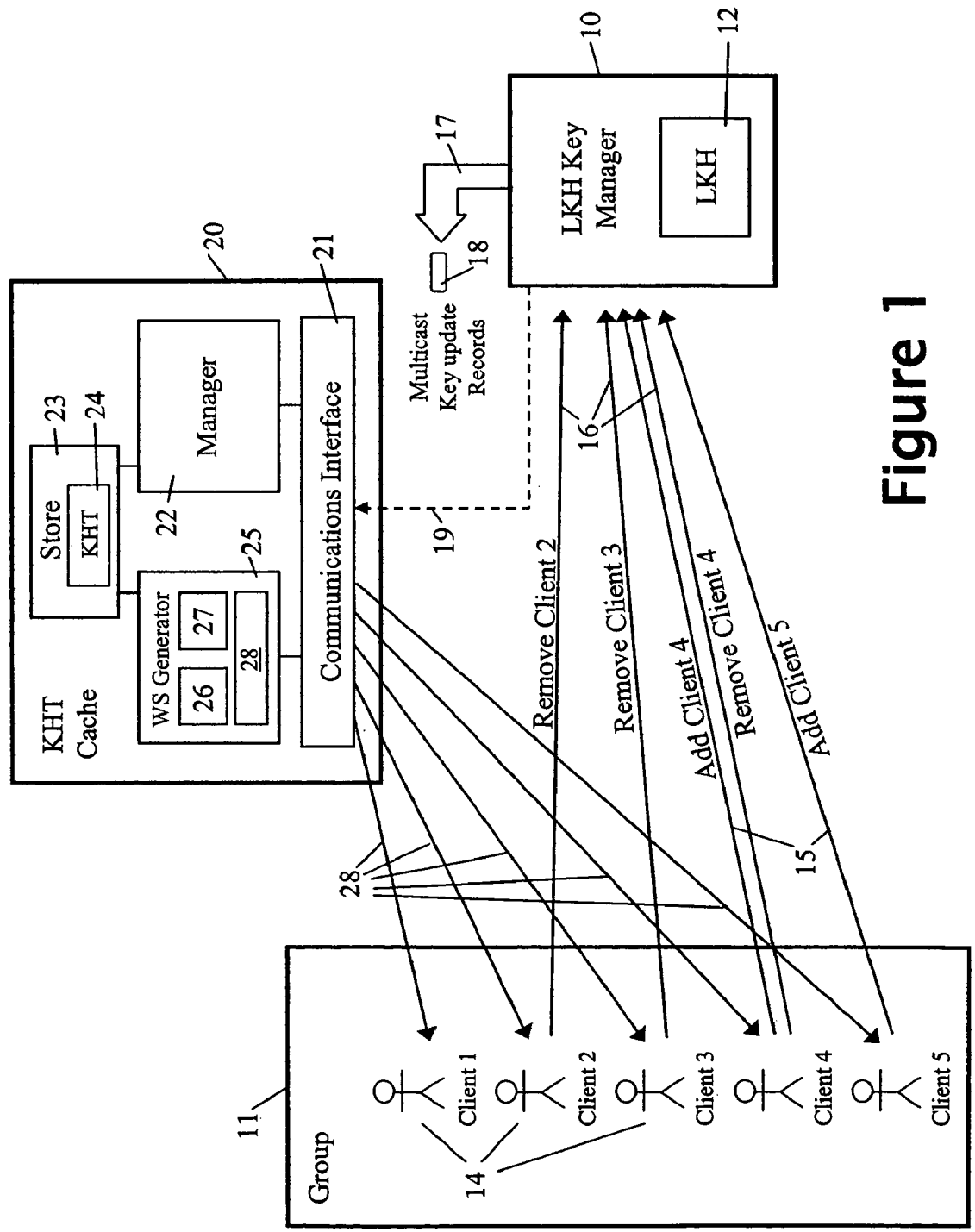
FIG. 1 is a diagram of a key distribution arrangement.

The key update management arrangement shown in FIG. 1 comprises a key manager 10 for managing the membership of a group 11 of clients (also referred to as group members) 14 as well as the generation, organisation and distribution of keys to currently on-line group members 14. The FIG. 1 arrangement also comprises a Key History Tree (KHT) cache 20 embodying the present invention and operative to provide consolidated key update information to returning clients 14 who have been offline and may have missed key updates from the key manager 10. It will be appreciated that although the clients 14 are depicted in FIG. 1 by person icons, a client may be an autonomous device and even where a client is associated with a human user, that user will be acting through an associated device; the term "client" should therefore be interpreted herein according to its context to refer to a client device and/or an associated human user.

In the FIG. 1 arrangement to be described below, the key manager 10 manages a Logical Key Hierarchy (LKH) 12 of the general form described in the above mentioned IEFT RFC 2627; more particularly, a variant of LKH is employed, called LKH+ that uses key hashing to generate new keys in respect of newly added members. In order to facilitate an understanding of the present invention a brief description will first be given of the operation of the key manager 10 in relation to the management of the LKH 12 as members are added and removed from the group 11. It should, however, be understood that application of the present invention is not limited to the form of key hierarchy to be described below or as described in the above-mentioned RFC 2627 and that the invention can be applied to any explicit or implicit key hierarchy.

Figure 2:
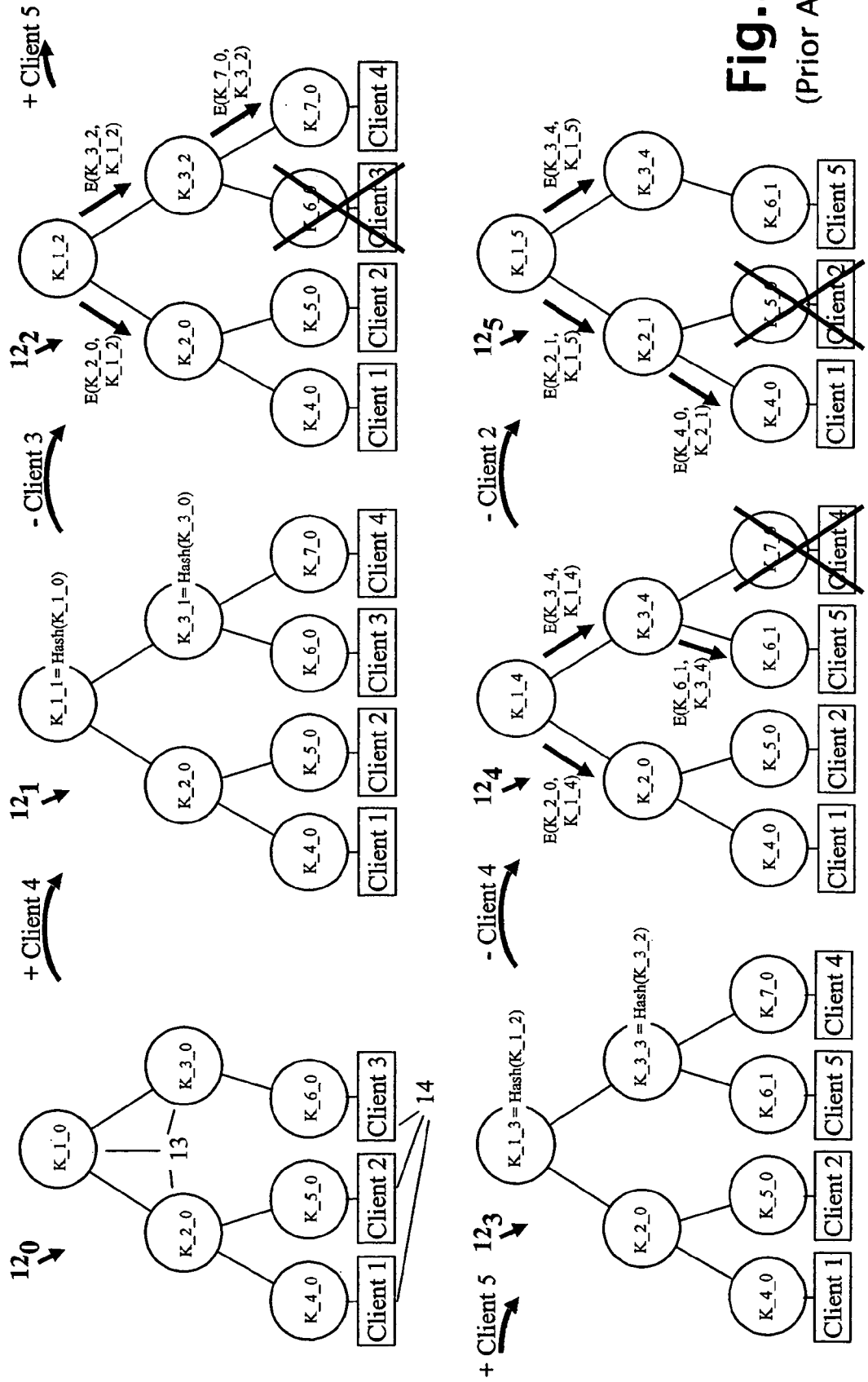
FIG. 2 is a diagram illustrating the operation of a known logical key hierarchy manager of the FIG. 1 arrangement.

The LKH 12 is a hierarchy of keys created by the key manager 10 to facilitate re-keying consequent on membership changes. For simplicity, the LKH 12 is here taken to be a binary tree, although the hierarchy can be easily generalized to an n-ary tree. As shown in FIG. 2 in respect of an initial version $12_0$ of the LKH, each node 13 corresponds to a secret key K_i_j where i=id(n) is the position in the tree of node n (herein the "node identifier"), and j is the version number of this key (herein the "version identifier"). The version identifier is initially zero and is incremented by one every time the key changes (this version number is never reused for a particular position in the tree). In conventional manner, the position identifier of a node in the binary tree is given as follows:

$id(n)=1$ if n is root $id(n)=2*id(\text{parent}(n))$ if n is left child $id(n)=1+2*id(\text{parent}(n))$ if n is right child In FIG. 2 the node identifier id(n) of each node 13 is not explicitly shown against each node but can be readily determined by reference to the value of "i" in the corresponding key identity K_i_j appearing inside each node.

Each group member 14 (initially, clients 1 to 3) is associated with a respective leaf node of the LKH. It will be assumed that each initial client 1 to 3 knows all the keys in the path from its associated leaf node to the root (for example, the initial clients may have received these keys in respective secure authenticated sessions with the key manager 10). The root key (initially K_1_0) is thus known by all the initial group members and can be used to guarantee confidentiality of group communications.

FIGS. 1 and 2 depict a series of changes to group membership with FIG. 2 showing the resultant changes to the LKH keys (the various versions of the LKH are referenced $12_0$ to $12_5$ respectively). The sequence of membership changes considered is:

Addition of new client 4
Removal (voluntarily or forced) of client 3
Addition of new client 5
Removal of client 4
Removal of client 2

The adding of a new client involves, for the purposes of achieving backward confidentiality, changing the keys in the path from the LKH leaf node associated with the new client to the root node. For the LKH+ scheme described here, this change is effected by hashing each affected key using a hashing algorithm known to all members and the key manager 10. The new key versions of the affected keys are then sent by the key manager to the new client over a secure party-to-party connection, after mutual authentication. It is not necessary to send these new key versions to the pre-existing members because they can themselves generate the new version of any of these keys that lie on their respective paths to the root simply by hashing the existing version already in their possession (the need of hashing a key before using it to decrypt encrypted information of interest is usually apparent from a difference between the version number of the key already held by the client and the version number of the key used to encrypt the encrypted information, this latter version number generally being supplied along with the encrypted information).

By way of example, when client 4 is added to the group 11, a new leaf node corresponding to a new key K_7_0 is appended to the LKH (see LKH $12_1$ in FIG. 2) and the client 4 is associated with this node. The versions of the keys encountered between the key K_7_0 and the root of the hierarchy, including the root key itself, are hashed to produce respective new versions: thus key K_3_0 is hashed to produce key $K\_3\_1$ and key $K\_1\_0$ is hashed to produce $K\_1\_1$. The keys $K\_7\_0$, $K\_3\_1$ and $K\_1\_1$ are then sent over a secure connection to the new client 4.

When a member is removed from the group 11, in order to ensure forward confidentiality the key manager 10 must change all the non-leaf keys known to that member and communicate the new versions of these keys to all the remaining members. This has to be done in a way that does not disclose these new versions of the keys to the removed member, or any number of cooperating removed members. The key manager 10 proceeds bottom up, changing each key along the path from the node associated with the removed member (which node is itself removed) to the root node of the LKH. Each new key version at one level in the hierarchy is encrypted using the or each of its children (descendant node keys) to form a corresponding number of key update records 18 (see FIG. 1) which are then multicast by the key manager 10 for use by the group members (see arrow 17). Each key update record 18 comprises, in addition to the corresponding encrypted key, the node identifier and version identifier of both the encrypting and encrypted key, these identifiers being in clear. As a result, each remaining member receives the new versions of the changed keys with the or each new key version that lies on the path between the member's leaf node and the hierarchy root being encrypted using a key which that member either already has (or can derive by hashing), and/or can obtain by decrypting one or more of the encrypted new key versions working upwards from a known key.

By way of example, consider the removal of client 3 illustrated in FIG. 2. Immediately prior to removal of this member, the LKH exists in version $12_1$. Upon removal of client 3, the associated node (the one corresponding to key $K\_6\_0$) is removed and the keys $K\_3\_1$ and $K\_1\_1$ are updated to versions $K\_3\_2$ and $K\_1\_2$ respectively (these key versions are, of course, not generated by hashing the previous versions since the removed client 3 could emulate this process, but are generated using any appropriate technique for producing an unpredictable result). The key hierarchy now exists in the version 122 illustrated in FIG. 2. The new key versions are then encrypted using their descendants giving the following encrypted keys:

$E(K\_2\_0, K\_1\_2)$
$E(K\_3\_2, K\_1\_2)$
$E(K\_7\_0, K\_3\_2)$ where $E(\ )$ indicates that the first key within the brackets has been used to encrypt the second key in the brackets. These three encrypted keys are then each combined with the version and node identifiers of the encrypting and encrypted keys to form three key update records 18 that are multicast by the key manager 10 (as indicated by the thick straight arrows in FIG. 2).

Turning now to a consideration of the KHT cache 20 embodying the present invention, this cache is provided to facilitate re-keying for group members returning after a period offline. A KHT manager 22 of the cache 20 is arranged to receive, via communications interface 21, the records 18 output by the key manager 10 and to consolidate them into a key history tree (KHT) 24 adapted to enable any returning group members to determine the current group key (that is, the current version of the LKH root key).

The system made up of the key manager 10, the cache 20, the group of clients 14 and the related communications infrastructure, can be configured to operate such that the key manager 10 continues to multicast the records 18 to all online group members with the KHT cache providing KHT information to returning members in any suitable manner such as in response to individual requests or by multicast. However, in an alternative operational configuration, preferred for certain applications, the key manager 10 does not multicast the records 18 but simply provides them to the cache 20 which consolidates these records into the KHT 24 and multicasts KHT information to all online members whether or not they have been offline for any period.

Each group client should, of course, be satisfied that any KHT information it receives is genuine before using it; this can be achieved in many different ways such as by using an authenticated communications channel with the cache 20, by the cache 20 digitally signing the KHT information and/or by the key manager 10 digitally signing records 18 incorporated into the KHT information.

The KHT information output by the KHT cache 20 can comprise the whole KHT 24; however, as will be more fully described hereinafter, the output KHT information can advantageously be a subset of the KHT, this subset being chosen on the basis of what contextual information is likely to be already known by group members. Whilst outputting only a subset of the KHT reduces the bandwidth and processing resources consumed, it does mean that occasionally a returning client 14 will not have enough information to recover the group key; in this case the client will need to contact the LKH key manager 10 directly to re-register using a secure channel.

The KHT 24 is a simple data structure that is held in a store 23 of the cache 20 and is created and managed by the manager 22 without any knowledge of the structure of the group 11; indeed, the cache 20 does not even have to be a member of the group. In the present embodiment, the KHT 24 has the same overall structure as the LKH 12 but each node of the KHT stores (or more, generally, has associated with it), for each of its descendents, the latest (most up-to-date) record containing its encrypted key that uses the corresponding descendant key for this encryption. However, as the KHT has to be inferred from the records 18 provided by the key manager 10 and as information such as the position of a newly added member is not included in these records, the KHT may not track exactly the original LKH tree. In fact, by using certain conventions on how the LKH tree changes, it is still possible to ensure that all the group members can recover the group root key. Such a convention provides, for example, that when a leaf node is split into two nodes to extend the tree, the previous leaf node always occupies the leftmost position. Also, only leaf nodes are pruned and not internal nodes with a single descendent.

Figure 3:
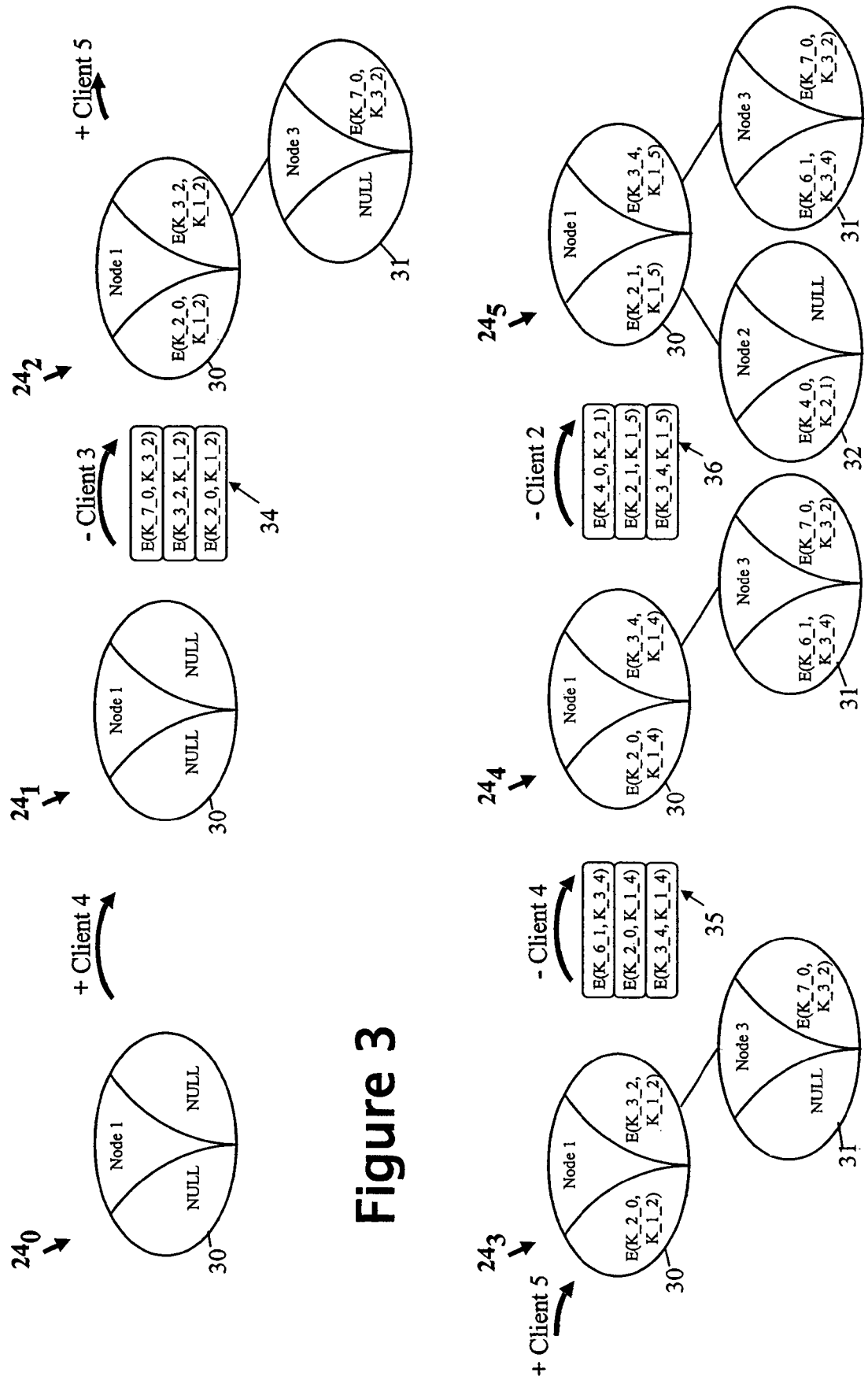
FIG. 3 is a diagram illustrating the operation of a key history tree, KHT, cache of the FIG. 1 arrangement.

FIG. 3 shows how the KHT 24 evolves as a result of the addition and removal of clients to the LKH 12 depicted in FIG. 2 example. Initially, it is assumed that the KHT simply comprises a root node 30 that holds no encrypted-key record for either of its two potential descendants—this is KHT version $24_0$.

Upon the client 4 being added, since the LKH+ method is being used, the key manager 10 only communicates key information to the new client 4 and no record 18 is produced. As a result, the cache manager 22 does not change the KHT so that the KHT version $24_1$ existing after the addition of client 4 corresponds to the initial KHT version $24_0$.

When client 3 is removed from the group 11, the key manager 10 sends a batch 34 of three records 18 to the cache 20, these records respectively comprising encrypted keys $E(K\_7\_0, K\_3\_2)$, $E(K\_3\_2, K\_1\_2)$, and $E(K\_2\_0, K\_1\_2)$ together with the related node and version identifiers for the encrypting and encrypted keys. The KHT manager 22 detects that there is a new LKH node 3 because of the update record $E(K\_7\_0, K\_3\_2)$, allocates a new KHT node 31 for it, and stores the update record in the new node 31 in respect of its implied right child (because the node identifier of the encrypting-key node identifier is an odd number, namely "7"). The KHT manager 22 also stores in the KHT root node 30 the update records $E(K\_2\_0, K\_1\_2)$ and $E(K\_3\_2, K\_1\_2)$ in respect of the left and right child respectively of the root node. The KHT is now in its version $24_2$.

The addition of client 5 to the group 11, like the addition of client 4, causes no changes in the KHT so that KHT version $24_3$ is the same as KHT version $24_2$.

When the client 4 is removed from the group 11, the key manager 10 sends a batch 35 of three update records 18 to the cache 20, these records respectively comprising encrypted keys $E(K\_6\_1, K\_3\_4)$, $E(K\_3\_4, K\_1\_4)$, and $E(K2\_0, K\_1\_4)$ together with the related node and version identifiers for the encrypting and encrypted keys. The KHT manager 22 processes the update record $E(K\_6\_1, K\_3\_4)$ by storing it in the node 31 for the left child of the latter. The KHT manager 22 processes the update record $E(K\_2\_0, K\_1\_4)$ by using it to overwrite the existing record $E(K\_2\_0, K\_1\_2)$ stored in the root node 30 for the left child of the latter since the newly received record refers to a newer encrypted version of the LKH root key (version 4 as opposed to version 2). Similarly, the KHT manager 22 processes the update record $E(K\_3\_4, K\_1\_4)$ by using it to overwrite the existing record $E(K\_2\_0, K\_1\_4)$ stored in the root node 30 for the right child of the latter. Note that it is not necessary to keep any update record concerning an older key version that has been superceded by a more up-to-date version since any record that uses the older key version for encryption will itself be superceded by a new record triggered by the change to the encrypting key.

When the client 2 is removed from the group 11, the key manager 10 sends a batch 36 of three update records 18 to the cache 20, these records respectively comprising encrypted keys $E(K\_4\_0, K\_2\_1)$, $E(K\_2\_1, K\_1\_5)$, and $E(K\_3\_4, K\_1\_5)$ together with the related node and version identifiers for the encrypting and encrypted keys. The KHT manager 22 detects that there is a new LKH node 2 because of the update record $E(K\_4\_0, K\_2\_1)$, allocates a new KHT node 32 for it, and stores that record in respect of its left child. The KHT manager 22 processes the update record $E(K\_2\_1, K\_1\_5)$ by using it to overwrite the existing record $E(K\_2\_0, K\_1\_4)$ stored in the root node 30 for the left child of the latter. Finally, the KHT manager 22 processes the update record $E(K\_3\_4, K\_1\_5)$ by using it to overwrite the existing record $E(K\_3\_4, K\_1\_4)$ stored in the root node 30 for the right child of the latter.

Algorithm 1 below describes in more detail the rules used by the KHT manager 22 to update the KHT (manager 22 is typically implemented as a processor arranged to execute code embodying Algorithm 1).

---

Algorithm 1 - Processing update $E(K\_i\_j, K\_l\_m)$ in KHT

Create in KHT empty nodes in path from root to l (if not present)
Find node N in KHT at position l
IF i is even { //left child
   Find $E(K\_i\_x, K\_l\_y)$ the left child record of N
   IF ((m > y) AND (j >= x)) {
     Overwrite $E(K\_i\_x, K\_l\_y)$ with $E(K\_i\_j, K\_l\_m)$
   } //End IF
else { //right child
   Find $E(K\_i\_x, K\_l\_y)$ the right child record of N
   IF ((m > y) AND (j >= x)) {
     Overwrite $E(K\_i\_x, K\_l\_y)$ with $E(K\_i\_j, K\_l\_m)$
   } //End IF
} //End IF Note that if no record is stored in respect of a descendant of the node N, then the values x and y are treated as being −1.

---

It can be seen from Algorithm 1 that an update record is only stored if both the version of the encrypted key concerned is more up-to-date than any record already stored for the same key and descendant (encrypting key), and the encrypting key used is not older (is not an earlier version) than the current one. All the other cases can be safely ignored because either they break the basic LKH rule of updating keys bottom up or they do not add new information. Of course, it would be possible to arrange for a newly received record to overwrite an existing record where the encrypted key versions were the same (and the encrypting key used for the newly received record was not older than that of the existing record) but this is not needed.

It may also be noted that checking the encrypting key version should not be required if the key manager is operating correctly and the updates are received in order, since in these circumstances the encrypting key version for a received record should not be earlier than that used for a corresponding record already stored in the KHT 24. Thus, it is possible to implement the manager 22 in such a manner that it does not check the encrypting key version and this information can therefore be omitted in the records supplied to the cache 20. However, inclusion of the encrypting key version in the update records is preferred as it provides robustness and enables a client to determine the number of hashes required to be made to derive certain keys, as will be more fully explained hereinafter.

With regard to the exact form of the KHT 24 data structure, it will be appreciated by persons skilled in the art that many different implementations are possible. Furthermore, it will be appreciated that the tree structure of the KHT will generally not be explicitly represented by links, such as pointers, between node data sets (that is, the data stored in respect of each node of the KHT). Instead, the node data sets will typically include data implicitly placing the nodes into a tree arrangement; thus, each node data set can simply comprise the stored records 18 for that node as these records contain sufficient data, in the form of the LKH node identifiers, to define the structure of the KHT tree. The node data sets can, of course, take forms other than that of stored records 18—for example, each node data set could take the form of a specific data structure with a node identifier and entries for holding, for each potential child, an encrypted version of the corresponding key, and the version identifiers of the encrypted and encrypting key (the node identifier of the encrypted key being, of course, the same as the node identifier of the data structure and the node identifier of the encrypting key being, for example, implicit in the ordering of entries in the data structure). In this case, the manager 22 does not directly store any received record as such but extracts any required information for storage in the corresponding node data structure.

Where explicit links between KHT nodes are stored as part of the overall KHT data structure, then these links themselves (for example, parent-child links and sibling links) can be used to identify the nodes so that it becomes unnecessary to store explicit node identifiers.

Returning to a consideration of the specific embodiment of the KHT 24 and manager 22 described above with respect to FIG. 3 in which the KHT node data sets take the form of stored records 18, whenever the cache 22 provides KHT information to group clients 14, it does so by sending the stored records 18 constituting all (or part) of the current KHT version.

It will be appreciated that the above-described key tree is client agnostic which enables the tree, or a subset of it, to be multicast to returning members without the need for client-specific customisation.

Algorithm 2 describes the processing done by a client 14 to update their local state after receiving a set of key update records either directly from the LKH key manger 10 or from the KHT cache 22.

---

Algorithm 2 - Processing a set of E(K__i__j,K__l__m) updates by client

FOR EACH update E(K__i__j,K__l__m) in post-order tree traversal {
  IF (node i is in path from client to Root){
    Find key for node l in local cache, namely, key K__l__r
    IF (r<m){
      Find key for node i in local cache, namely, key K__i__n
      Obtain candidate K__i__j by hashing K__i__n for (j-n) times
      Obtain K__l__m by decrypting E(K__i__j,K__l__m)
        with candidate K__i__j
      IF (K__l__m is OK) {
        Add K__l__m to local cache
      }//End IF
    }//End IF
  } //End IF
} //End FOR EACH

---

First, the client 14 orders the received updates so that updates lower in the tree are processed first. Each update is then processed in turn with the first processing steps being to filter out any update that does not lie on the path between the client and the LKH root or that does not relate to a newer key version than that already stored. If an update survives the filtering steps, the client 14 tries to decrypt the encrypted key contained in the update by finding the appropriate key in its local cache (this key being either one previously stored or one that has been revealed during earlier processing of the KHT information). However, in certain cases the decryption key that the client has locally might be an older version than is needed in which case the client hashes this older version as many times as necessary to obtain the actual key. The required number of hashes is indicated by the difference between the encrypting-key version number j in the received update and the version number n of the corresponding key in the local cache.

Where the whole KHT 24 has been provided to the client, all the needed decryption keys will either be available in the local cache or will be obtainable by hashing. However, if only a subset of the KHT has been provided, it is possible that the subset is inadequate to ensure that a needed decryption key can be obtained by hashing. This situation is checked for in order to avoid polluting the local cache by storing an incorrectly decrypted key. This checking is effected, for example, by checking for padding errors that typically arise if decryption is done with the wrong key. This padding error check, whilst being a quick way to pick up a problem associated with decryption of a particular key update, is not infallible and should therefore be associated with a more thorough check. This latter check may be one conducted for a batch of update records rather than for each update record. For example, Algorithm 2 can be run to completion for a batch of updates with each decrypted key produced being temporarily tagged; after Algorithm 2 has finished a check is then carried out on the basis of a validator of the LKH root key that was included with the KHT information provided to the client. This validator is, for example, a HMAC of a known text created (and possibly signed) by the key manager 10 using the appropriate version of the root key; if this validator cannot be reproduced at the clients, the client either rolls back all the tagged keys to their previously stored versions in the local cache or re-registers with the key manager, effectively clearing the local cache and then inserting the correct key values. Of course, this check effected for a batch of updates can be carried out independently of whether or not a padding error check is effected in respect of each update.

If the encrypting-key version number is not included in the key update as indicated hereinbefore for a non-preferred embodiment, then the client can work on a trial and error basis to determine the number of times, if any, that the decryption key needs to be hashed in order to satisfactorily decrypt the encrypted key contained in the key update. Thus, for example, the client can initially try the decryption key without hashing it and then use the above-mentioned padding error check to see if the result appears successful—if an error is detected, the decryption key is hashed once and used again to try to decrypt the encrypted key. If an error is again detected, the hashed key is hashed again and so on. This process of hashing and checking is repeated until either a successful result is achieved or a predetermined upper bound on the number of hashes to be tried is reached (for example, 300 hashes).

The process of updating the KHT 24 in the KHT cache 24 can only result in the KHT growing in size and this is likely to rapidly make it too large to be efficiently distributed by the KHT cache 20. However, this will not be the case for all applications and it may be noted that a benefit of distributing the whole KHT to a client 14 is that the client can potentially just keep as state its original key (that is, the original version of the key corresponding to the LKH leaf node with which the client is associated) and derive from the KHT and that key the current group key.

Generally, though, it will be highly desirable for the KHT information passed to a client 14 to be a subset of the KHT maintained by the KHT manager 22. In this context, it is useful to introduce the notion of KHT Working Set (KHT-WS). The KHT-WS is the minimal subset of the KHT that will allow all clients to recover the current version of the group key. This subset is also a tree with the same root as the KHT, since in LKH a change of a key triggers a change in its parent key. Each leaf of this tree corresponds to the lowest node in the KHT corresponding to a key that a relevant client cannot derive just by hashing local keys.

The KHT cache 20 includes a working set (WS) generator 25 that is responsible for using the KHT 24 to produce the KHT-WS or, as will be seen, an approximation to the latter. If the WS generator 25 knew the state of every client (that is, knew what key versions each client held locally) it would be possible to produce a precise KHT-WS. For example, in FIG. 3 if after removing client 2 the KHT manager 22 were able to assume that client 5 knew about K__1__4, then the manager 22 could safely delete node 3 to obtain the KHT-WS since the manager 22 knows that client 5 already has K__3__4 in its local cache (since otherwise it would not have been able to decrypt K__1__4).

Whilst it is possible to provide mechanisms by which the WS generator 25 could keep track of the state of every client 14, in many applications this would require a large overhead.

Therefore, in the present embodiment the WS generator 25 is arranged to provide an approximation of the KHT-WS without tracking client state information. Ideally, this approximation would be conservative enough so that it contains the real KHT-WS but small enough to be communicated efficiently; however, generally the approximation will be such as to result in the occasional failure of a client to recover the current group key.

The WS generator 25 derives the KHT-WS approximation by:
- determining the approximate size of the working set, $WS_{size}$ (effected by functional entity 26 in FIG. 1),
- computing for each node in the KHT the likelihood $P_i$ of being part of the working set (effected by functional entity 27), and
- forming the approximated KHT-WS by using the $WS_{size}$ number of nodes of the KHT that have the highest $P_i$ (effected by functional entity 28).

How accurately $WS_{size}$ can be determined depends on how much feedback the entity 26 receives directly or indirectly from the clients 14 about the usefulness of the KHT-WS approximations being sent out by the KHT cache 20. Preferably, the entity 26 is notified every time a KHT-WS approximation is inadequate and causes a client 14 to fail when attempting to recover the current group key. This can be achieved, for example, by arranging for the key manager 10 to notify the KHT cache every time a client needs to re-register with the key manager as a result of a failure to the recover the group key (see dashed arrow 19 in FIG. 1); rather than a notification being sent to the KHT each time a client re-registers, a notification can be sent at periodic intervals indicating the number of failures in the preceding interval. The failure rate feedback provided to the entity 26 is used by the latter to dynamically adjust the value of $WS_{size}$ to approach a desired maximum target failure rate. The magnitude of these adjustments is computed using a variant of the Newton optimization method, and is based on the changes in failure rate caused by previous variations of the KHT_WS.

In practice, it has been found that the probability of a failure $p_{fail}$ is a decreasing function of $WS_{size}$ that becomes zero when $WS_{size}$ has its maximum value, i.e., no pruning of the KHT has taken place. It is possible to obtain the value of $WS_{size}$ needed for a particular target failure probability $p_{target}$, by solving the non linear equation:

$$p_{fail}(WS_{size}) - p_{target} = 0$$

By applying a numerical iterative method to solve it, such as the Newton method this gives:

$$WS_{size}^s = WS_{size}^{s-1} - \frac{p_{fail}(WS_{size}^{s-1}) - p_{target}}{p'_{fail}(WS_{size}^{s-1})}$$

where s indicates the current iteration. In the above equation, the denominator term concerning the slope in the previous iteration, can be estimated for small variations of $WS_{size}$ on the basis, validated by observation, that $p_{fail}$ is "well-behaved" with smooth transitions of slope whereby:

$$p'_{fail}(WS_{size}^{s-1}) \simeq \frac{p_{fail}(WS_{size}^{s-1}) - p_{fail}(WS_{size}^{s-2})}{WS_{size}^{s-1} - WS_{size}^{s-2}}$$

Moreover, in order to make the estimation of the derivative more robust to "noise" in the input, the sequence of values obtained can be subjected to low passing filtering and samples with very small variations of $WS_{size}$ (and therefore more "noisy") or with positive slope eliminated. In practice, this method has been found to be quite robust, tracking accurately $p_{target}$ within a few iterations.

As regards the determination of the relative importance $P_i$ of each KHT node, in the present embodiment the entity 27 does this on the basis of a combination of ageing, previous behaviour of the clients as regards how often they update their state, and an estimate of the number of possible clients that will need that node; it is, of course, also possible to take into account different factors.

The ageing criterion concerns how long a key update has been in the KHT-WS with updates that have never been added to the KHT-WS being given the highest priority to ensure that new updates are quickly propagated. For key updates that have been added to the KHT-WS, their age is computed by time stamping each update (or the associated node) with the time $t_i$ when the update is first added to the KHT-WS, and using this time stamp to determine the current age of the update (or node); where $t_{now}$ is the current time, the age of an update (or node) is thus $(t_{now} - t_i)$.

As regards how frequently clients update their state, this can be characterized by an exponential distribution of rate $\lambda$. This state update behaviour is combined with the key ageing information to give a probability of an arbitrary client needing that key as illustrated in the example below.

The number of clients that need a particular node is related to the distance to the root, at least in the case of a node allocation scheme that tries to keep the tree reasonably balanced. For a balanced binary tree, the importance of a key can be taken to be half the importance of its parent.

Using the above criteria, the relative importance $P_i$ of each KHT node can be computed recursively in the following way where $P_i$ is set to 1 for the root key:

$$\begin{cases} P_i = 1 & \text{If } i = 1 \\ P_i = P_{i/2} * 0.5 * Prob(LastAccess > t_i) & \text{If } i \neq 1 \end{cases}$$

where the importance of a key update is half the importance of its parent multiplied by the probability of an arbitrary client needing that key update. This latter probability is determined as the probability that the client last accessed the service associated with the key manager before the key version was added to the KHT-WS. Thus:

$$Prob(LastAccess > t_i) = 1 - (1 - e^{-\lambda*(t_{now} - t_i)}) = e^{-\lambda * \Delta t}$$

Intuitively, the longer a key version has been in the KHT-WS the less likely it is to be needed, and the more frequent that are accesses to the service by clients the less likely is that they are not up to date with keys.

After the approximate size $WS_{size}$ of the working set and the relative importance $P_i$ of each KHT node have been determined, the functional entity 28 forms the KHT-WS approximation by using the $WS_{size}$ number of nodes of the KHT that have the highest $P_i$. This approximation is then output to the clients 14.

The above-described KHT cache 20 provides a good balance between the size of the KHT information provided to returning clients and the group-key recovery failure rate. Much of the operation of the KHT cache is "transparent". Thus, the KHT cache neither mediates authenticated interactions between clients and the LKH key manager nor needs to decrypt key updates from the manager (with the result that if the KHT cache is compromised, the confidentiality of the group keys is not breached). Moreover, since the KHT information supplied by the cache can take the form of the update records output by the LKH key manager, the KHT cache can be added without modifying the clients of an existing LKH implementation. The LKH key manager does not need to be aware that its content is being cached by the KHT cache because its only required interaction with the KHT cache is to "forward" messages to be broadcasted (however, as noted above, performance of KHT pruning heuristics can be improved when the LKH key manager also provides additional information to the KHT cache).

As the keys stored in the key tree are in encrypted form, the KHT cache 20 can be located in any part of the communications network used for key update distribution and, in particular, can be situated where it can most reliably receive the key updates from the key manager 10 and multicast the key tree, or a subset of it, to returning members. More than one KHT cache 20 can be provided in the network.

To facilitate scalability, the KHT cache 20 can be arranged to provide its output to second-level KHT caches that are responsible for respective sub-groups of the client group 11, each sub-group being made up of the clients 14 associated with a respective sub-tree of the LKH hierarchy. Each second-level KHT cache uses the KHT information it receives from the KHT cache 20 to form a KHT tree but only in respect of the key updates corresponding to the nodes of the LKH sub-tree with which the second-level cache is associated plus the relevant key updates for the path from the root of this sub-tree that terminates at the root of the LKH tree. Each second-level KHT cache is arranged to provide KHT information either directly to the clients of its associated sub-tree or to third-level KHT caches each responsible for a subset of these clients, and so on.

This hierarchical arrangement of KHT caches can be extended to as many levels as desired. At each level of this hierarchical arrangement, other than the first level, each KHT cache is arranged to maintain its KHT tree only in respect of keys corresponding to the nodes of a respective predetermined sub-hierarchy of the LKH and keys for the path from the head of this sub-hierarchy that terminates at the root of the key hierarchy.

With regard to the KHT information passed from a KHT cache to a lower-level KHT cache in such a hierarchy, this information can (as with the KHT cache 20 of FIG. 1) either be the whole KHT held by the cache providing the information, or a KHT-WS generated by the latter. By arranging for the KHT information to be in the same form as the records output by the key manager 10, it is possible to provide a high degree of flexibility in how the KHT caches are arranged.

It may also be noted that the key manager 10, rather than providing key update records to a single KHT cache that is at the head of a KHT-cache hierarchy, can provide the update records directly to multiple KHT caches that correspond to the second-level KHT caches described above.

The embodiment of the KHT cache 20 described above with respect to FIG. 1 gives robustness for group re-keying with off-line members when it is undesirable to either re-key every time a member becomes off-line or to trigger an expensive recovery action when back on-line. This is the case when members go off-line frequently, the group membership is very large, or it is impossible to accurately determine who is on-line at a particular time. Example applications include:

Mobile wireless secure group communication: due to the limited power available in mobile devices, they are off-line most of the time; in addition, the network has frequent temporary disconnections.

Loosely coupled secure groups: in order to reduce overhead, a key is not shared by all members all the time—however the group members do need to synchronize keys from time to time. Additionally, connectivity between group members may be reduced by physical location or administrative burdens.

Anonymous Group Content Delivery (AGCD): content is distributed to a subscriber community (e.g., to implement a "pay-per-view" scheme) in a manner which ensures that the distribution source cannot learn what a particular client downloads. A practical solution is to encrypt content with a key shared by the current "paying" members, and use multicasting or caching of encrypted content for efficient delivery. However, since these members are not "on-line" all the time, key updates are preferably embedded with the content so that the majority of valid members can still recover the current key.

Figure 4:
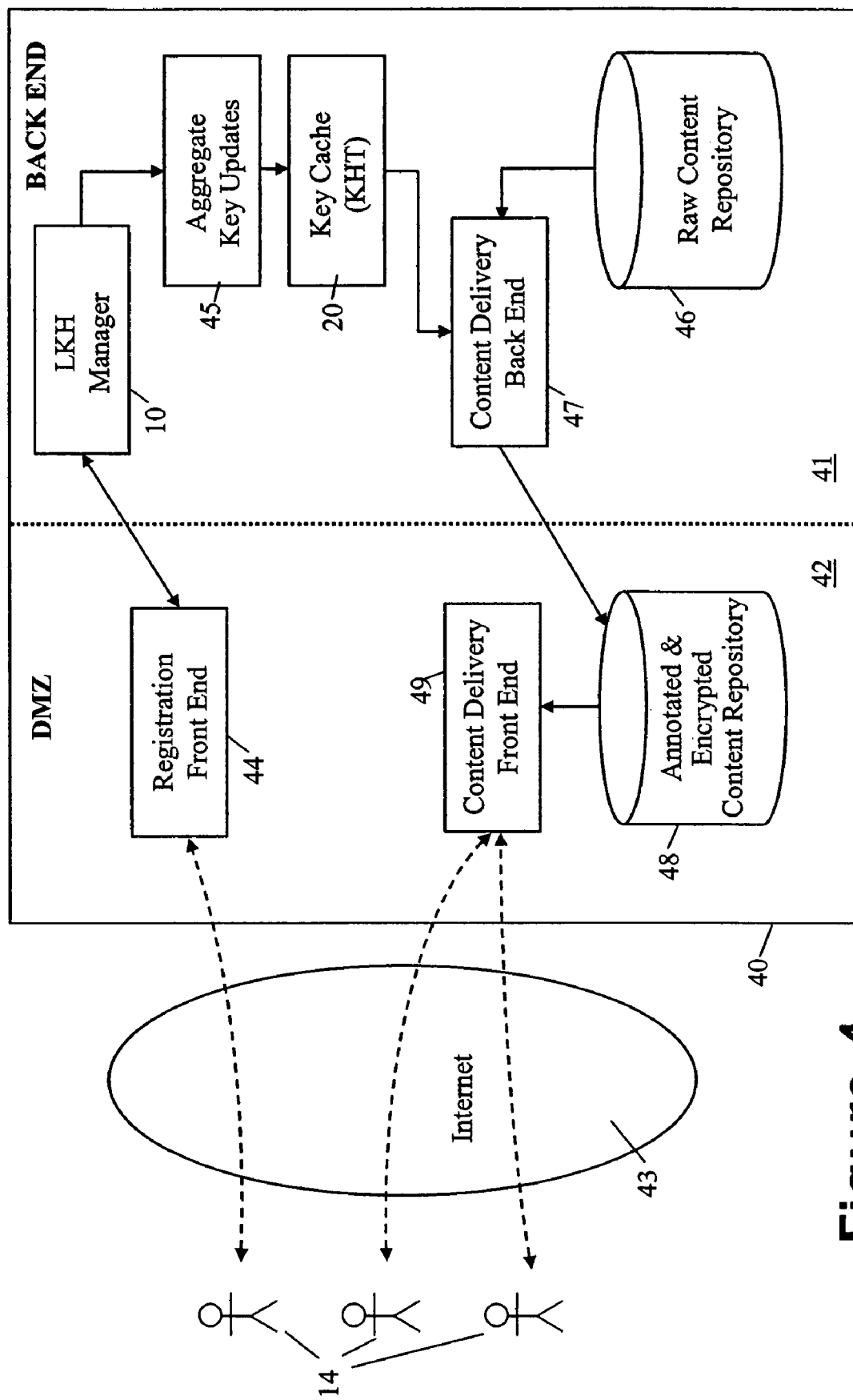
FIG. 4 is a diagram an anonymous group content delivery system incorporating a KHT cache.

FIG. 4 shows an AGCD system incorporating a KHT cache. An AGCD server installation 40 is arranged to delivery encrypted content over the internet 43 to registered clients 14. The server installation comprises a DMZ ("De-Militarised Zone") section 42 and a back end section 41 separated by security firewalls (not shown). The DMZ section 42 comprises a registration front end 44, a repository 48 for encrypted content annotated with key update information, and a content delivery front-end server 49. The back end section 41 comprises an LKH key manager 10, a unit for aggregating key updates output by the key manager 10, a KHT cache 20, a raw content repository 46, and a content delivery back-end unit 47 that encrypts content from the repository 46 and combines the encrypted content with KHT information from the cache 20 to form annotated encrypted content 48 that is then stored in the repository 48.

The FIG. 4 AGCD system operates as follows:

To become a member of the secure group associated with the content service provided by the installation 40, a new client 14 registers with the registration front end 44 and, after authentication and subscription payment, the new client is provided with a set of keys that correspond to a path in the LKH tree, as described above.

The changes in the LKH tree consequent on the addition of a new client or removal of an existing client (for example, for failing to pay a subscription renewal) results in the key manager 10 outputting key update records. For efficiency reasons, key updates are aggregated, preferably over a specific period, by unit 45 before being passed on to the KHT cache 20.

The aggregated key updates are passed to the KHT cache 20 that calculates the minimal update information (the above-described KHT-WS approximation) required by currently registered clients 14 to enable them recover the new group key (with a target failure probability).

The content delivery back-end unit 47 uses the current group key to encrypt the content that will be provided to subscribers and adds to it the KHT-WS approximation from the KHT cache 20. In a preferred variant, in order to reduce the overhead of re-encrypting previous content when the group key changes, the group keys are used to encrypt keys that are more "permanent", but unique for each content unit, and these are the ones actually used for encrypting content. The encrypted content, the related KHT information and the encrypted content key are stored in the repository 48.

The content delivery front-end server 49 forwards the encrypted content, annotated with the related KHT information and the encrypted content key, to whoever requests it. This is done without authenticating clients or needing to know keys, so that content can be cached or multicast without reducing security or adding overhead in the server 49 and without breaching the anonymity of the clients.

Clients download the annotated encrypted content from the server 49 and try to decrypt it using their current knowledge of the group key, or the keys that they can derive from the annotated KHT information. If a client can successfully decrypt the received content, it updates its local state with the new keys.

If a client cannot recover the group key from the annotated KHT information, the client has to authenticate itself again with the registration front end 44 to obtain the new keys.

It will be appreciated that many variants are possible to the above described embodiments of the invention. For example, whilst in the above-described embodiment of the KHT cache 20, the KHT 24 is separately maintained from the KHT-WS, it would be possible, though not preferred, to prune the KHT 24 to the KHT-WS each time KHT information was output.

With regard to the key update records output by the LKH key manager 10, the hierarchy-node and key version information included in each record for the encrypting and encrypted key can be provided in forms other than as respective explicit identifiers and may be provided in implicit form. For example, for the LKH node numbering scheme described above, the LKH hierarchy node number of the encrypted key can be derived from that of the encrypting key by halving the latter and rounding it down to the nearest integer value; thus, inclusion of the encrypting key hierarchy-node identifier in a key up date record effectively also provides hierarchy-node information about the encrypted key. Furthermore, given the version number of one of the encrypting and encrypted keys, the version number of the other key can be expressed as a delta (change in version number) relative to the given version number. With regard to version information about the encrypting key, as already indicated, this information can be omitted from the key update records, though this is not preferred. Finally, and again as already indicated, the form in which version information about the encrypted key is included in a key update record may differ from the form in which this information is held in the KHT tree.

The invention claimed is:

1. Apparatus for managing key updates in a logical key hierarchy, comprising:
   a communication interface operable for receiving at a cache, records generated by a key-hierarchy manager for members using the logical key hierarchy, wherein the records include key updates comprising an encrypted key corresponding to a node of the logical key hierarchy and encrypted using a key that corresponds to a descendant of that node, hierarchy-node information for both the encrypted and encrypting keys and key-version information for at least the encrypted key; and
   a manager of the cache operable to consolidate the records into a key history tree, wherein the key history tree has the same structure as the logical key hierarchy, the manager storing at each node of the key history tree, for each encrypted key associated with the node, the most up-to-date version of the encrypted key and its version information with any earlier versions being discarded.

2. Apparatus according to claim 1, wherein the manager is arranged to store each said most up-to-date version of a said encrypted key by storing the record containing the latter, with any previously-stored record being superseded is discarded.

3. Apparatus according to claim 1, wherein the manager is arranged to store in association with each tree node, along with the most up-to-date version of the corresponding encrypted key stored for each encrypting key used in respect of that encrypted key, version information for the encrypting key used to encrypt said most up-to-date version of the encrypted key, this version information being included in the record providing said most up-to-date version of the encrypted key.

4. Apparatus according to claim 3, wherein the manager is arranged to replace the version of the encrypted key stored in association with a tree node for a particular encrypting key, with any subsequently received later version of the encrypted key provided the latter has been encrypted with a version of the encrypting key that is the same or later than the version used for encrypting the existing stored encrypted key.

5. Apparatus according to claim 1, further comprising a working-set generator for processing the key history tree to generate a subset of the key history tree enabling, at least within a target failure rate, all clients associated with the key hierarchy to recover the current root key of the latter.

6. Apparatus according to claim 5, wherein the working set generator comprises control means for receiving feedback on the current root-key recovery failure rate and for controlling the size of said subset to approach the actual failure rate to said target failure rate.

7. Apparatus according to claim 6, wherein the working set generator further comprises determining means for determining the likelihood of a tree node being required to enable recovery the current root key relative to at least one of the age of the node, or of an encrypted key associated with the node, and an estimate of the number of possible clients that will need the node.

8. Apparatus according to claim 1, wherein the manager is arranged to maintain said key history tree only in respect of keys corresponding to the nodes of a predetermined sub-hierarchy of said hierarchy and keys for the path from the head of this sub-hierarchy that terminates at the root of the hierarchy.

9. Apparatus according to claim 1, further comprising a key-hierarchy manager for managing said key hierarchy in dependence on the addition or removal of members, the key-hierarchy manager being arranged to output said records both to currently available members and to said apparatus as notification of the changes made by the key-hierarchy manager to the key hierarchy, said apparatus being arranged to provide said key history tree, or a subset of said key history tree, to members who subsequently become available as a consolidated notification of the changes made by the key-hierarchy manager to the key hierarchy to enable said members to recover the current root key of the key hierarchy at least within a target failure margin.

10. Apparatus according to claim 1, further comprising a key-hierarchy manager for managing said key hierarchy in dependence on the addition or removal of members, the key-hierarchy manager being arranged to output said records to said apparatus, said apparatus being arranged to provide said key history tree, or a subset of said key history tree, to members as a consolidated notification of the changes made by the key-hierarchy manager to the key hierarchy to enable said members to recover the current root key of the key hierarchy at least within a target failure margin.

11. Apparatus according to claim 10, wherein the apparatus including the key-hierarchy manager forms part of an anonymous group content distribution arrangement; the key history tree, or a subset of key history tree, being sent to members in association with content encrypted with a key that is one of:
   the key-hierarchy root key, and
   a key encrypted using the key-hierarchy root key and provided in encrypted form along with the encrypted content.

12. A system comprising multiple apparatuses and a key-hierarchy manager for managing said key hierarchy in dependence on the addition or removal of members and for outputting key update records reflecting changes made to the key hierarchy; the apparatuses being configured in a multiple-level hierarchical arrangement comprising a first-level apparatus arranged to receive the records output by the key-hierarchy manager, and one or more lower levels of apparatuses each arranged to receive the key history tree, or a subset of key history tree, produced by a said apparatus at the next level up, the apparatuses at the lowest level of the hierarchical arrangement each being arranged to provide its key history tree, or a subset of its key history tree, to a respective sub-group of members; the apparatuses at each level of said hierarchical arrangement, other than said first level, each being arranged to maintain its said key history tree only in respect of keys corresponding to the nodes of a respective predetermined sub-hierarchy of said key hierarchy and keys for the path from the head of this sub-hierarchy that terminates at the root of the key hierarchy.

13. A method of consolidating key updates provided in records that a key-hierarchy manager generates for members using a key-hierarchy, each comprising an encrypted key corresponding to a node of the key hierarchy that is used by the members and encrypted using a key that corresponds to a descendant of that node, hierarchy-node information for both the encrypted and encrypting keys, and key-version information for at least the encrypted key; the method comprising a tree-maintenance step of maintaining in a computer, on the basis of said records, a key history tree with tree nodes corresponding to nodes in said key hierarchy, this tree-maintenance step comprising a sub-step of storing in association with each tree node of the key history tree, for each encrypting key used in respect of the encrypted key associated with the node, the most up-to-date version of the encrypted key and its version information with any earlier versions being discarded.

14. A method according to claim 13, wherein in said sub-step each, said most up-to-date version of a said encrypted key is stored by storing the record containing the latter, with any previously-stored record being superseded is discarded.

15. A method according to claim 13, wherein in said sub-step, the version information of the encrypting key used to encrypt said most up-to-date version of the encrypted key is stored with the latter.

16. A method according to claim 13, wherein in said sub-step, the version of the encrypted key stored in association with a tree node for a particular encrypting key, is replaced with any subsequently received later version of the encrypted key provided the latter has been encrypted with a version of the encrypting key that is the same or later than the version used for encrypting the existing stored encrypted key.

17. A method according to claim 13, further comprising the further step of processing the key history tree to generate a subset of the key history tree enabling, at least within a target failure rate, all clients associated with the key hierarchy to recover the current root key of the key hierarchy.

18. A method according to claim 17, wherein the further step comprises receiving feedback on the current root-key recovery failure rate and controlling the size of said subset to approach the actual failure rate to said target failure rate.

19. A method according to claim 18, wherein said further step further comprises determining the likelihood of a tree node being required to enable recovery of the current root key, this determination being based on at least one of the age of the node, or of an encrypted key associated with the node, and an estimate of the number of possible clients that will need the node.

20. A method according to claim 13, wherein said key history tree is maintained only in respect of keys corresponding to the nodes of a predetermined sub-hierarchy of said key hierarchy and keys for the path from the head of this sub-hierarchy that terminates at the root of the key hierarchy.

21. A method of providing key updates to members using the key hierarchy according to claim 13, comprising the steps of:
   managing the key hierarchy in dependence on the addition or removal of members and outputting, as notification of the changes made to the key hierarchy, records that each comprise an encrypted key corresponding to a node of the key hierarchy and encrypted using a key which is a descendant of that node, and hierarchy-node and key-version information for both the encrypted and encrypting keys; and
   consolidating said records and providing said key history tree, or a subset of said key history tree, to members enabling these members to recover the current root key of the key hierarchy at least within a target failure margin.

* * * * *

UNITED STATES PATENT AND TRADEMARK OFFICE
CERTIFICATE OF CORRECTION

PATENT NO. : 8,045,713 B2  
APPLICATION NO. : 10/814608  
DATED : October 25, 2011  
INVENTOR(S) : Antonio Lain et al.

Page 1 of 1

It is certified that error appears in the above-identified patent and that said Letters Patent is hereby corrected as shown below:

In column 16, line 21, in Claim 7, delete "recovery the" and insert -- recovery of the --, therefor.

Signed and Sealed this
Twenty-sixth Day of June, 2012

David J. Kappos
*Director of the United States Patent and Trademark Office*